July 18, 1972   R. S. CURTIS ET AL   3,677,807
METHOD OF MAKING BEARING BALLS
Filed Sept. 29, 1969
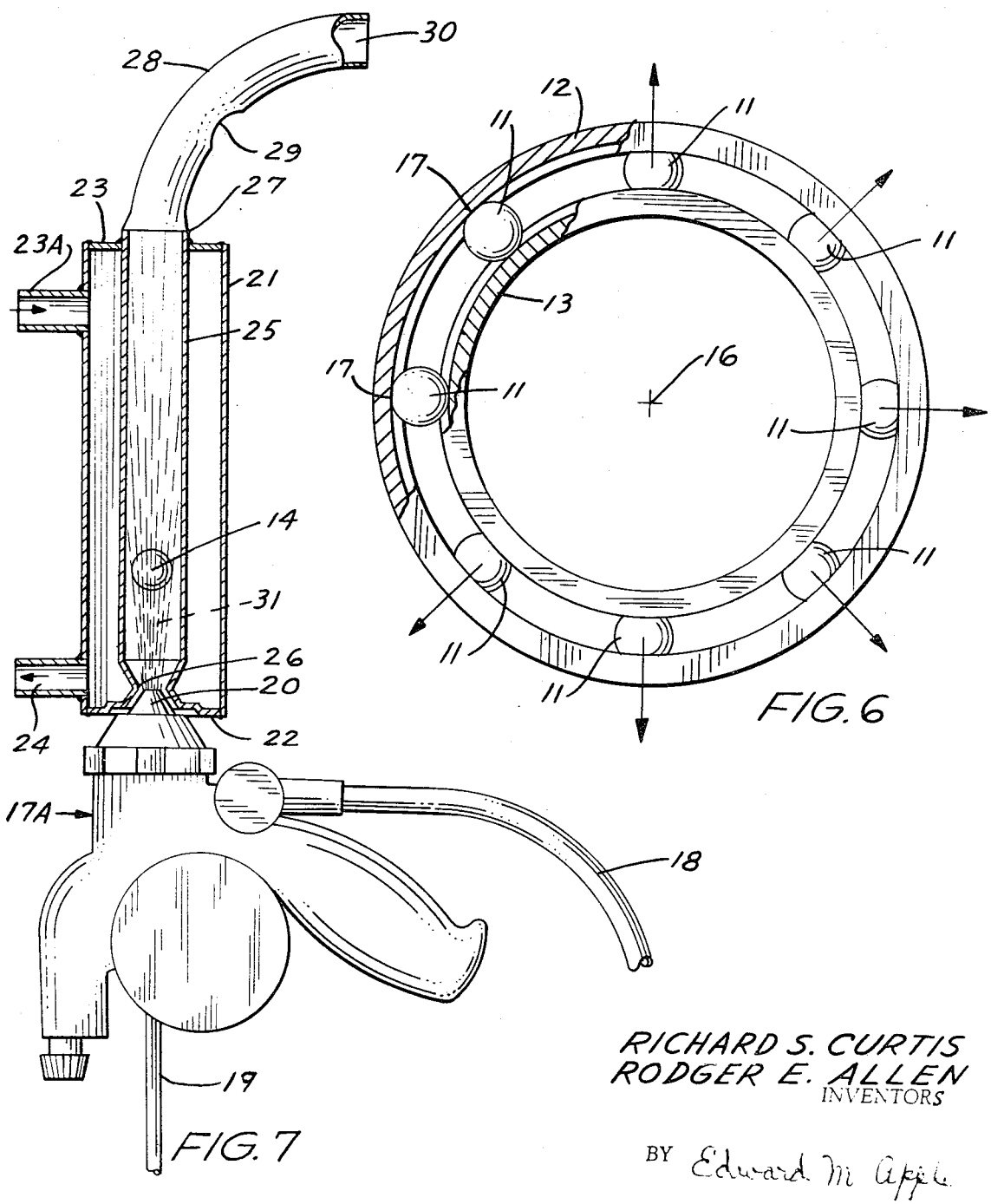
RICHARD S. CURTIS
RODGER E. ALLEN
INVENTORS
BY Edward M. Apple
ATTORNEY

United States Patent Office 3,677,807
Patented July 18, 1972

3,677,807
METHOD OF MAKING BEARING BALLS
Richard S. Curtis, 7887 Jackson Road, Ann Arbor, Mich. 48104, and Rodger E. Allen, 4203 W. 111th St., Inglewood, Calif. 90301
Filed Sept. 29, 1969, Ser. No. 870,314
Int. Cl. B44d 1/08; C23c 7/00
U.S. Cl. 117—105                1 Claim

ABSTRACT OF THE DISCLOSURE

This application discloses a ball, having a core of one material and a cover of another material deposited thereon, and the method of making it. The invention resides in the particular combination and arrangement of the components of the ball and in the process of manufacturing it.

---

This invention relates to the art of making metal balls for use in high speed bearing, such as used aircraft and the like, where maximum useable life and minimum weight factors predominate.

An object of the invention is to provide a ball which embodies both those factors, in toto, by fabricating the ball around a core of ceramic, or other suitable material, having the proper characteristics.

Another object of the invention is to teach a novel process, or method, of making a ball having a core of dissimilar material, such as a ceramic.

Another object of the invention is to provide novel apparatus for practicing the process, or method, so that the balls may be produced at economical cost and in the volume and at a rate commensurate with modern day technology.

Another object of the invention is to simplify the making of balls for high speed bearings and to provide such balls, which will out perform and out live any balls now known to the public, with corresponding improvement to the ball races and to the machines in which the bearings are used.

We are cognizant of the fact that others have worked on the problem and have disclosed other methods of forming lightweight balls, particularly hollow balls, as disclosed in U.S. Pat. No. 3,337,278, in which the balls are shown formed of a pair of hemispheres, which are then put together to form the ball. Such a method is costly and time consuming, and the balls so formed are, more often than not, out of balance, and do not equate the true center of the ball with the geometric center, with the dynamic consequences which naturally stem from such conditions when the balls are rotated at very high speeds.

It is, therefore, an object of this invention to obviate the foregoing difficulties, and to accomplish other objects, advantages and improvements, all of which will become more apparent as the description proceeds, reference being made from time to time to the accompanying drawing, forming part of the within disclosure, in which drawing:

FIG. 1 is a fragmentary, sectional view of a high speed bearing raceway, in which is positioned a ball manufactured under the teachings of the invention. Part of the ball is broken away and in section to show the core.

FIG. 2 shows, in elevation, the core on which the ball is built.

FIG. 3 is an elevational view, with parts of the metal broken away, and illustrating the core after it has been metallized and before the finishing steps have been taken.

FIG. 4 is a view similar to FIG. 3, but illustrating the ball after it has been partly finished by lapping.

FIG. 5 is an elevational view of the ball after it has been completely finished by lapping.

FIG. 6 is an elevational view, with parts in section and parts broken away, of a high speed bearing equipped with the balls embodying the invention.

FIG. 7 is a schematic view, with parts in section, of a device used in metallizing the balls embodying the invention.

Referring now, more particularly to the drawing, it will be understood that in the embodiment herein disclosed, the reference character 11, indicates, in general, a ball which has been fabricated as herein disclosed.

In FIG. 1, we show the ball 11 in place in a high speed bearing, consisting of an outer race 12, and an inner race 13. In this view, the ball 11 is shown with a ceramic core 14 and metallic cover 15.

In FIG. 2, we show the ceramic core 14 before it has been metallized, and in FIG. 3, we show the core 14 after being metallized and before the metal cover has been rough lapped.

In FIG. 4, we show the ball after it has been rough lapped, and in FIG. 5, we show the ball after it has been completely finished by lapping.

In FIG. 6, we show an elevational view of the high speed bearing shown in FIG. 1, which bearing consists of outer raceway 12 and inner raceway 13, and a plurality of balls 11 manufactured as herein taught.

It will be understood that in a bearing fabricated as herein disclosed, when rotated at high speed, the balls 11 rotate at approximately 50% of the r.p.m. of the inner race 13. When so rotated, the balls will develop a substantial centrifugal force and are forced against the outer race 12, as indicated by the outwardly directed arrows, which force is away from the axis 16 (FIG. 6) of the bearing. With each increase in the r.p.m., of the inner or outer race, the balls 11 will be forced against the outer race with proportionately more pressure at points 17 on the outer race 12.

Assuming that the ball weight is reduced, then the bearing may be operated for an extended life span at the same r.p.m., or the bearing may be operated at a much higher speed with the same useable life span.

We have found that with a 25% reduction in the weight of the balls fabricated as herein taught, we have increased the life of a bearing to 2.35 times the life of a similar bearing equipped with solid balls, and this with no loss in the sub-surface shear strength of the ball, and actually there is a slight increase in the crush strength of the ball or the compressibility of same.

U.S. Pat. No. 3,337,278 hereinabove referred to points out the advantages of balls with reduced weight in a confined orbit such as a bearing having inner and outer raceways. We have found out that balls manufactured as herein disclosed have distinct advantages over the balls manufactured as disclosed in the above mentioned patent. A ball manufactured by fabricating together two hemispheres, as taught by the previous patent, results in a ball having a heavy zone somewhere in its mass. This results in dynamic imbalance, which causes uneven wear on the balls and bearing raceways, with resulting shorter life of the bearing.

A ball formed as herein disclosed, starts with a core element, whose true center is the same as its geometric center, so that after metallizing the truly balanced core, and then lap finishing the metal, the resulting ball will have a perfect balance and a greatly reduced weight as compared to a solid ball of the same diameter.

Balls manufactured as herein disclosed have further advantages in that the time factor in production is greatly reduced. In other words, a ball manufactured as herein disclosed, may be fabricated in approximately 1/60 of the time required to manufacture a hollow ball manufactured as taught by the above patent. The cost of manufacturing hollow balls as disclosed by the said patent is approximately 300 times the cost of fabricating a ball as herein disclosed, for the reason that there is much less machine time and labor involved in the instant process.

Although we prefer to ultilize a ceramic core in the manufacture of our balls, it will be understood that other materials might be used with like advantage, so long as the cores are made of a material which is lighter or heavier in weight than the covering, depending upon the result desired.

It will also be understood that we prefer to form the balls by depositing stainless steel on a ceramic core. Further, it will be understood that other types of material may be used with equal effectiveness, so long as there is a difference in the weight or cost factor between the starting core and the coating.

Although we have disclosed herein the manufacture of balls for use in high speed bearings, it will be understood that such balls may also be used as gage balls, plug balls, and many other uses, including the technological air space demands of tomorrow.

In practicing our invention, we prefer to use an apparatus such as disclosed in FIG. 7, which apparatus consists of a conventional metallizing gun, which is generally indicated with the reference character 17A. The gun 17A is provided with suitable gas connections 18, and is provided with a metallic rod 19, which is fed into the gun 17A, heated and discharged as molten metal through the nozzle 20, as in conventional practice.

The apparatus further consists of a tubular member 21, which is closed at both ends, as at 22 and 23. The member 21 has an intake 24, and an outlet 23A which are respectively connected to a suitable source of coolant. The member 21 forms a cooling jacket around a second tubular member 25, which has a restricted opening 26, in which is received the nozzle 20 of the metallizing gun 17A. The opposite end of the tubular member 25 is open as at 27, and has received therein one end of an arcuate tubular member 28, the interior of which communicates with the interior of the tubular member 25. The tubular member 28 is provided with a cut-out portion 29, which serves as a ball charging and discharging opening. The upper end 30, of the arcuate tubular member is open, and serves as a discharging port for excess gases and material.

In operation, the apparatus functions as follows:

The metallizing gun 17A is ignited and the stainless steel rod 19 is fed into it as in conventional practice with metallizing guns. The metallizing gun discharges its products of combustion and molten metal from the rod 19 into the interior of the tubular member 25. The column of products of combustion and molten metal being indicated by the broken lines 31.

A core 14, of ceramic, or other suitable material, is loaded into the device through the opening 29, and falls by gravity to the depth in the tube 25 where the pressure of the gases will balance the force of gravity. There it will be suspended in the column 31 of gas and molten metal under the principle of the teachings of Bernoulli. As the core 14 remains in the column 31, it is being constantly rotated and bombarded by the molten particles from the gun 17A. When the layer of metal has built up sufficiently to increase the diameter of the ball to the approximate inside diameter of the tube 25, the pressure of the gases will then force the metal covered core out through the opening 27 and into the tube 28, and then out through the opening 29, where it will be recovered and be submitted to a suitable, conventional lapping process, or processes, preferably a preliminary lapping operation, and a finish lapping operation, until the ball 11 reaches its state of perfection as shown in FIG. 5.

Although we have disclosed herein the preferred form of apparatus for practicing our invention, it will be understood that the ball may be formed with other apparatus, all of which is in the contemplation of the invention.

Having described our invention, what we claim and desire to secure by Letters Patent is:

1. The process of making a bearing ball which consists of the steps of providing a ceramic core, supporting said core by a stream of hot gas, and then depositing on said core a layer of stainless steel, while so supported, the support of the said ball taking place in a tubular member of predetermined diameter the ball being forced from said tube, by said hot gases when said ball has reached the predetermined diameter of said tube.

References Cited
UNITED STATES PATENTS

| | | | |
|---|---|---|---|
| 2,114,377 | 4/1938 | Goss | 117—105.1 X |
| 2,609,256 | 9/1952 | Baker et al. | 308—188 |
| 2,763,921 | 9/1956 | Turner et al. | 29—198 |
| 3,212,834 | 10/1965 | Mayer et al. | 308—188 X |
| 3,442,690 | 5/1969 | Peake et al. | 117—100 |
| 3,202,537 | 8/1965 | Norman et al. | 117—Dig. 6 |

EDWARD G. WHITBY, Primary Examiner

U.S. Cl. X.R.

29—148.4 B; 117—94, 105.2, 105.3, 119.2, 121, 130 R; 308—188